June 21, 1966   C. VAN DER LELY   3,256,652
BUILDING OF ASSEMBLED BOX-SHAPED ELEMENTS
Filed Oct. 3, 1961   9 Sheets-Sheet 1

INVENTOR.
Cornelis van der Lely
BY
Mason, Mason & Albright
Attys.

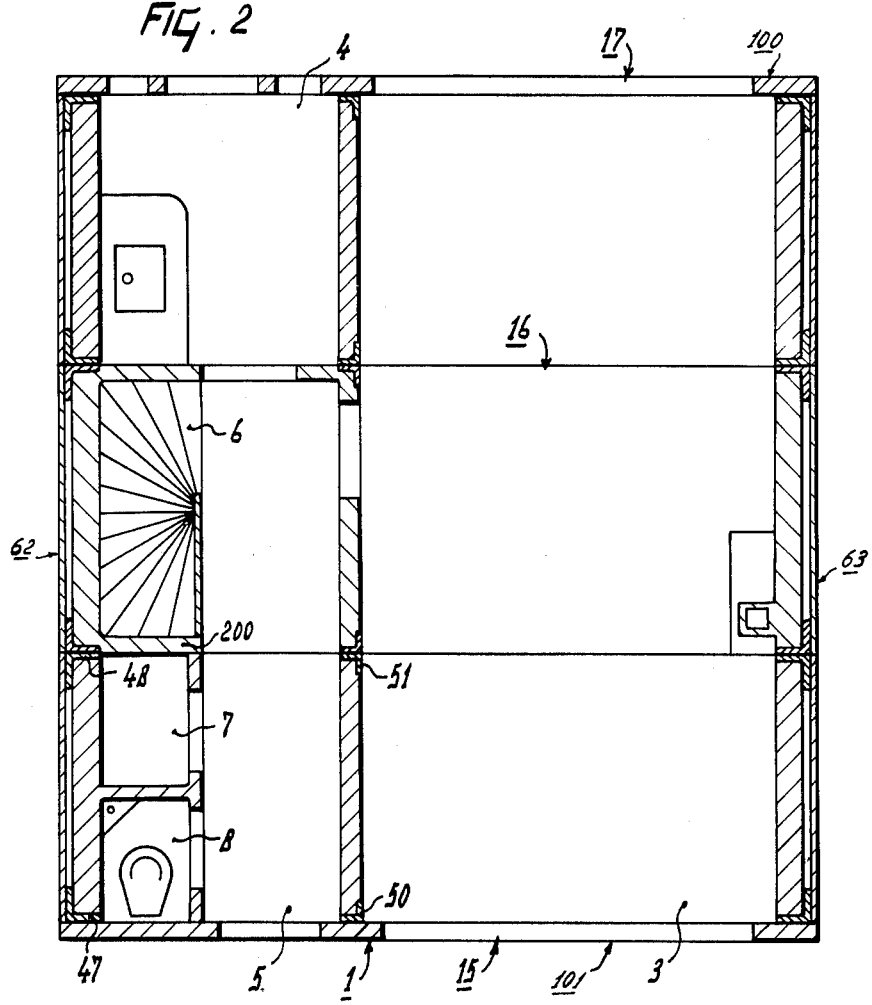

June 21, 1966     C. VAN DER LELY     3,256,652
BUILDING OF ASSEMBLED BOX-SHAPED ELEMENTS
Filed Oct 3, 1961     9 Sheets-Sheet 3
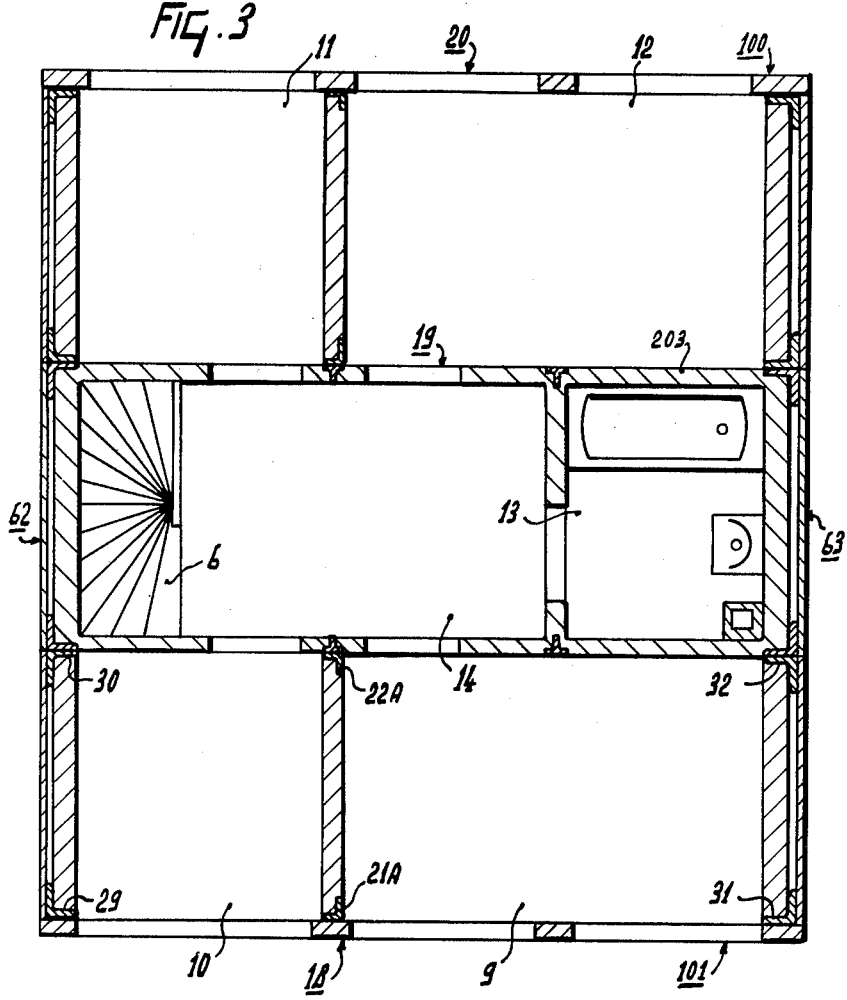
INVENTOR.
Cornelis van der Lely
BY
Mason, Mason & Albright
Atty's.

June 21, 1966   C. VAN DER LELY   3,256,652
BUILDING OF ASSEMBLED BOX-SHAPED ELEMENTS
Filed Oct. 3, 1961   9 Sheets-Sheet 4
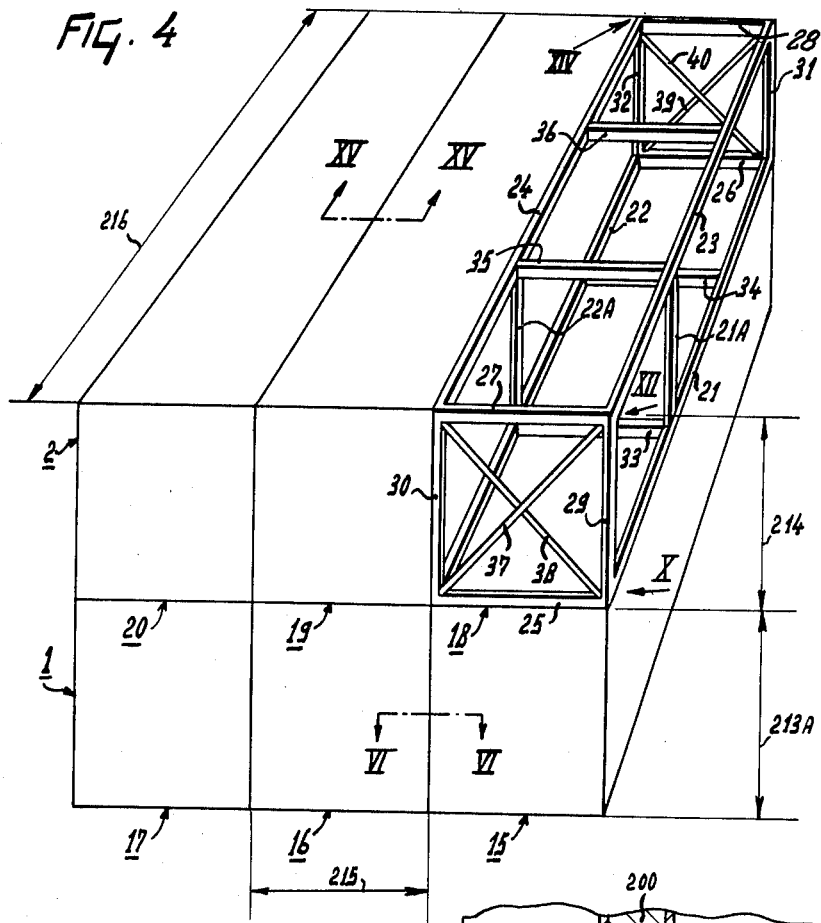
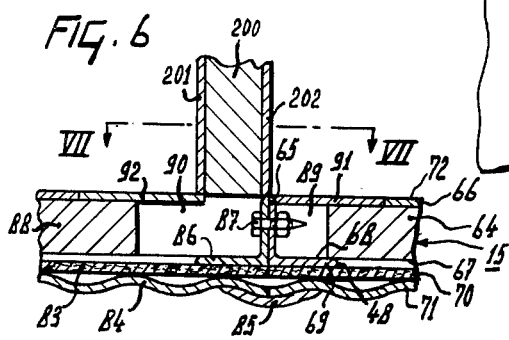
INVENTOR.
Cornelis van der Lely
BY
Mason, Mason & Albright
Attys.

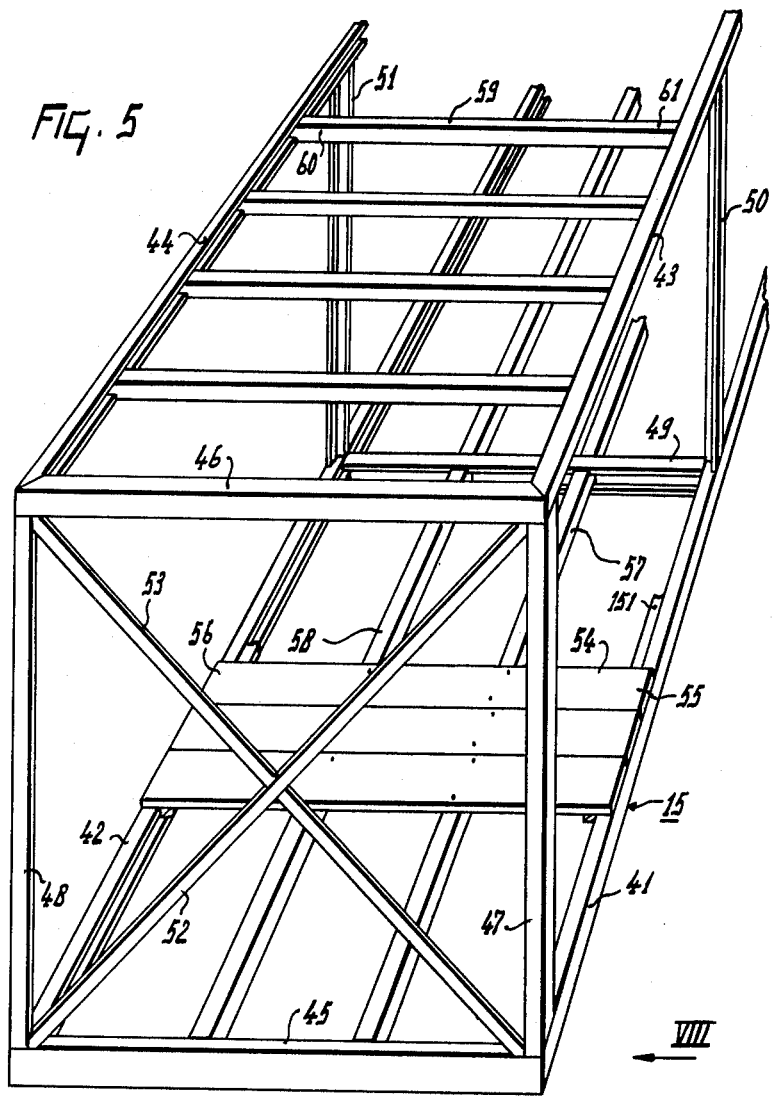

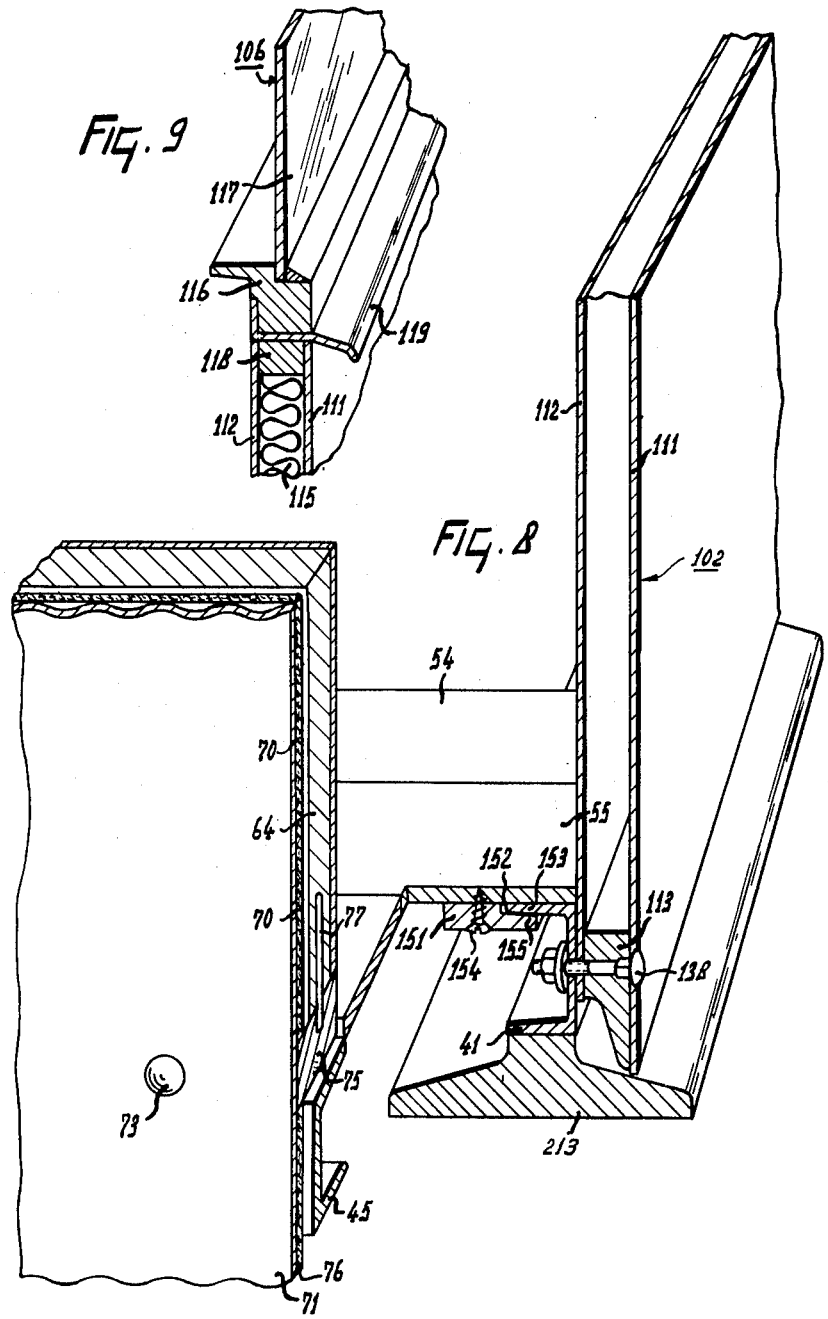

June 21, 1966   C. VAN DER LELY   3,256,652
BUILDING OF ASSEMBLED BOX-SHAPED ELEMENTS
Filed Oct. 3, 1961   9 Sheets-Sheet 7
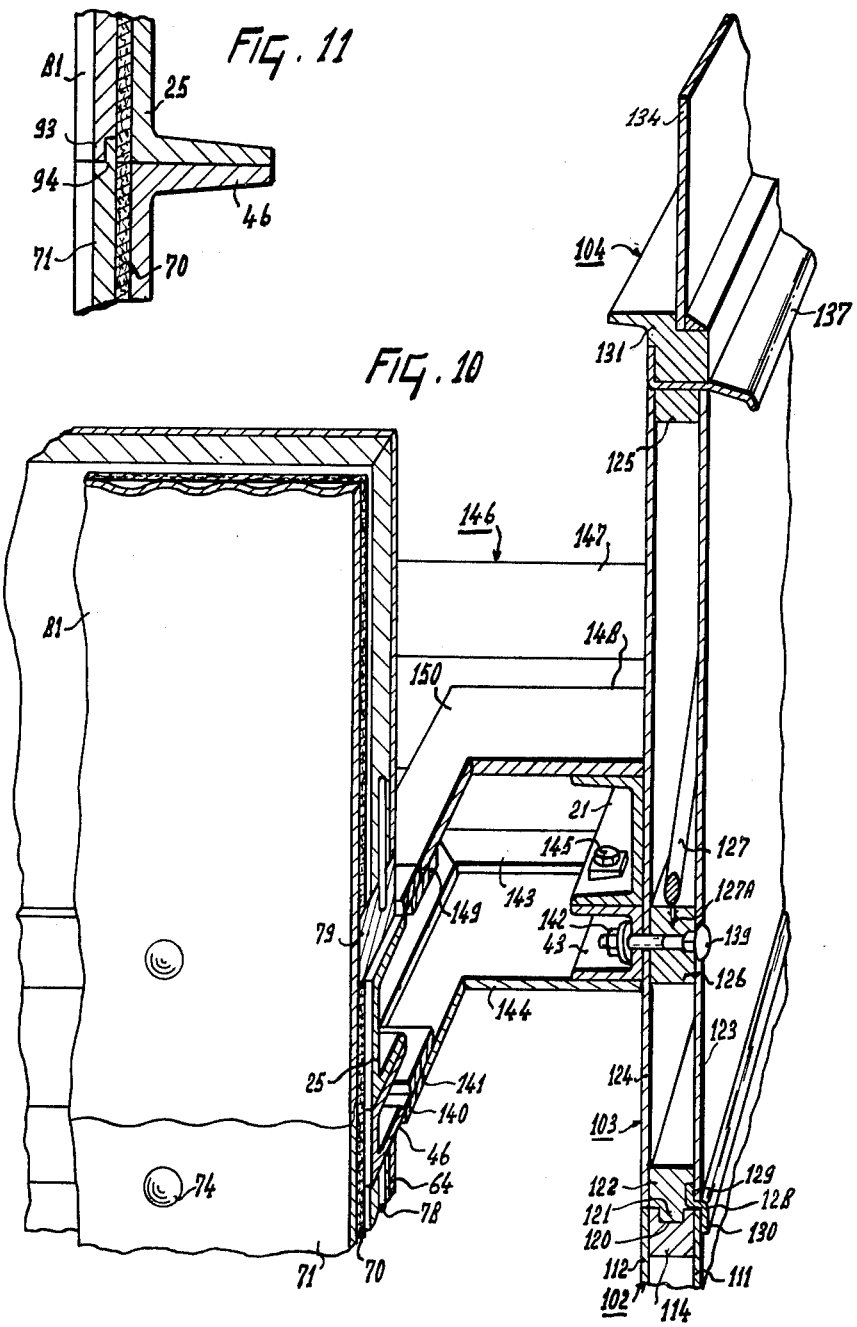

June 21, 1966  C. VAN DER LELY  3,256,652
BUILDING OF ASSEMBLED BOX-SHAPED ELEMENTS
Filed Oct 3, 1961  9 Sheets-Sheet 8
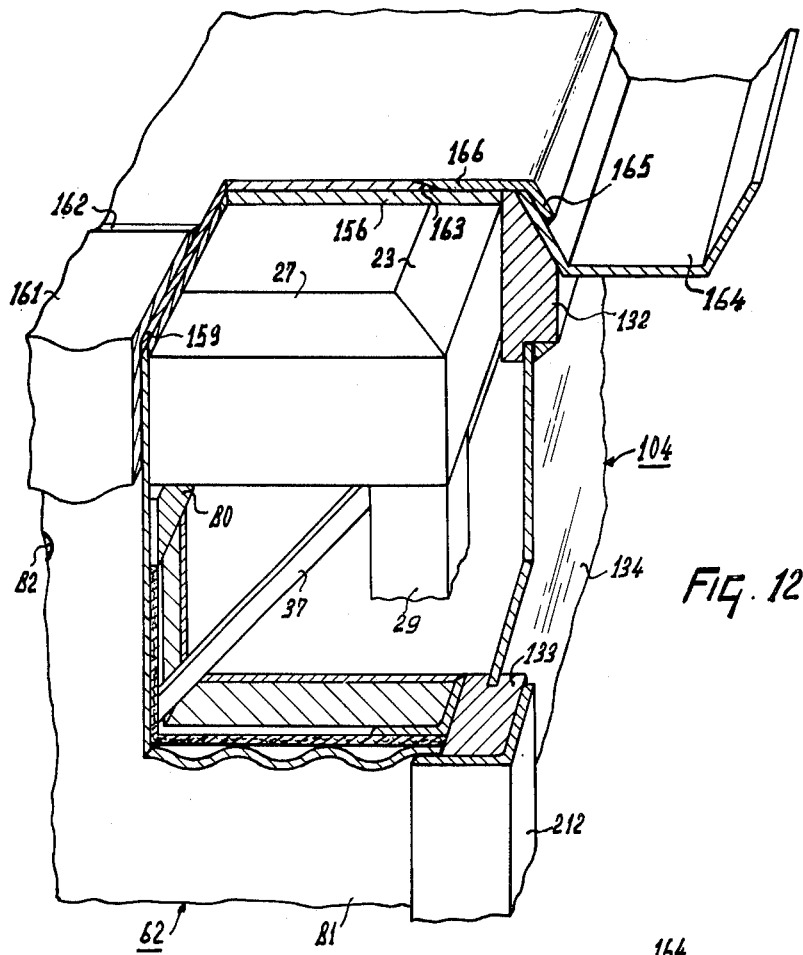
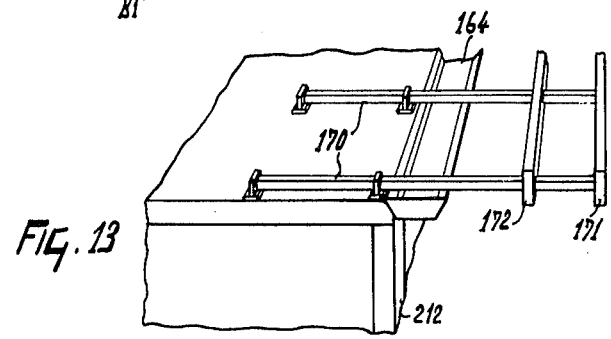

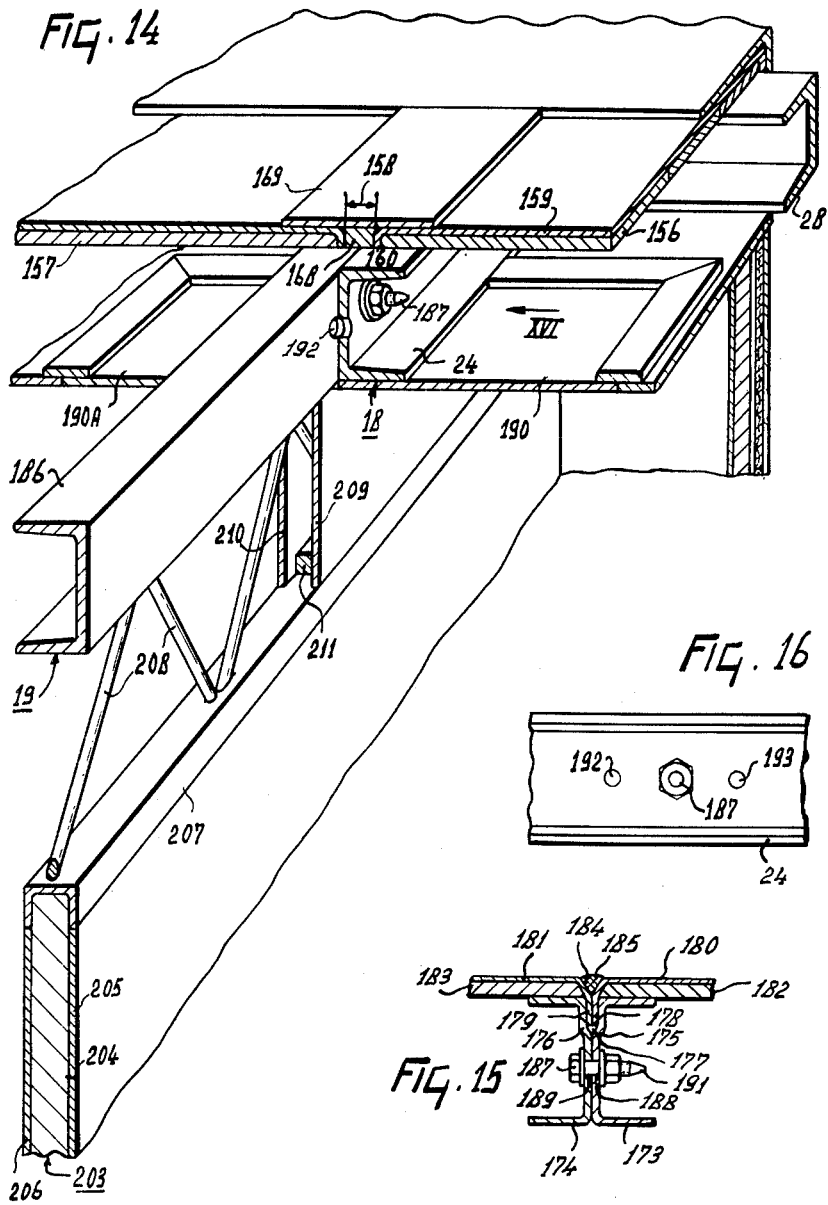

United States Patent Office 3,256,652
Patented June 21, 1966

3,256,652
BUILDING OF ASSEMBLED BOX-SHAPED ELEMENTS
Cornelis van der Lely, Zug, Switzerland, assignor to Patent Concern N.V., Curacao, Netherlands Antilles, a limited-liability company of the Netherlands Antilles
Filed Oct. 3, 1961, Ser. No. 142,592
Claims priority, application Netherlands, Oct. 8, 1960, 256,678
2 Claims. (Cl. 52—79)

This invention relates to a building.

The object of the invention is to construct a building quickly and simply. In accordance with the invention this is achieved by building it up from a number of box-shaped elements, each of which comprises at least part of a dwelling space and has a frame of beams, the elements being provided with vertical sides or walls, at least some of which are made from heavier material than the material of a horizontal side or sides comprising the ceiling or the floor or both.

A second aspect of the invention relates to a building which is constructed from a number of box-shaped, prefabricated elements, each of which comprises at least part of a dwelling space and has a frame of beams, whereby the walls of the elements are arranged for the major part between the beams of the frame.

A third aspect of the invention relates to a building comprising at least two dwelling floors and is constructed from a number of box-shaped, prefabricated elements, each of which comprises at least part of a dwelling space and is built up from a frame of beams forming alone the supporting structure of the building.

For a better understanding of the invention and to show how the same may be carried into effect, reference will now be made to the accompanying drawing, in which:

FIGURE 2 is a ground plan of the ground floor of the house shown in FIG. 1, and

FIGURE 3 is a ground plan of the top floor of the house shown in FIGURES 1 and 2.

FIGURE 4 shows diagrammatically the six elements of the house, of which six elements only the frame of one element is shown.

FIGURE 5 shows on an enlarged scale part of the frame of the foremost element of the lower elements of the house shown in FIGURES 1 to 4.

FIGURE 6 shows on an enlarged scale a sectional view of the corners of two adjacent elements, taken on the line VI—VI in FIGURE 4.

FIGURE 7 is an elevation of the detail shown in FIGURE 6, taken on the line VII—VII.

FIGURE 8 shows on an enlarged scale a corner of the house, indicated in FIGURE 5 by the arrow VIII, in which corner are shown part of the front facade and of the side facade.

FIGURE 9 shows on an enlarged scale a sectional view of a detail of the front facade of the building, taken on the line IX—IX in FIGURE 1.

FIGURE 10 shows the adjacent corners of two elements arranged one above the other, indicated in FIGURE 4 by the arrow X.

FIGURE 11 is a sectional view of engaging edges of the covering plates of the side facades of two elements lying one above the other.

FIGURE 12 shows on an enlarged scale the top corner of the house indicated in FIGURE 4 by the arrow XII, at which corner parts of the facades and the roof are shown.

FIGURE 13 shows part of the eaves on the front of the house, which eaves are shaped in a form differing from that shown in FIGURE 12.

FIGURE 14 shows the top corners of the two adjacent elements, indicated in FIGURE 4 by the arrow XIV.

FIGURE 15 is a sectional view of the top edges of two elements, lying one against the other and the top sides of which constitute the roof of the building, the view being taken on the line XV—XV in FIGURE 4.

FIGURE 16 is an elevation of the fastening means of two adjacent elements, viewed in the direction of the arrow XVI—XVI in FIGURE 14.

Figure 1:
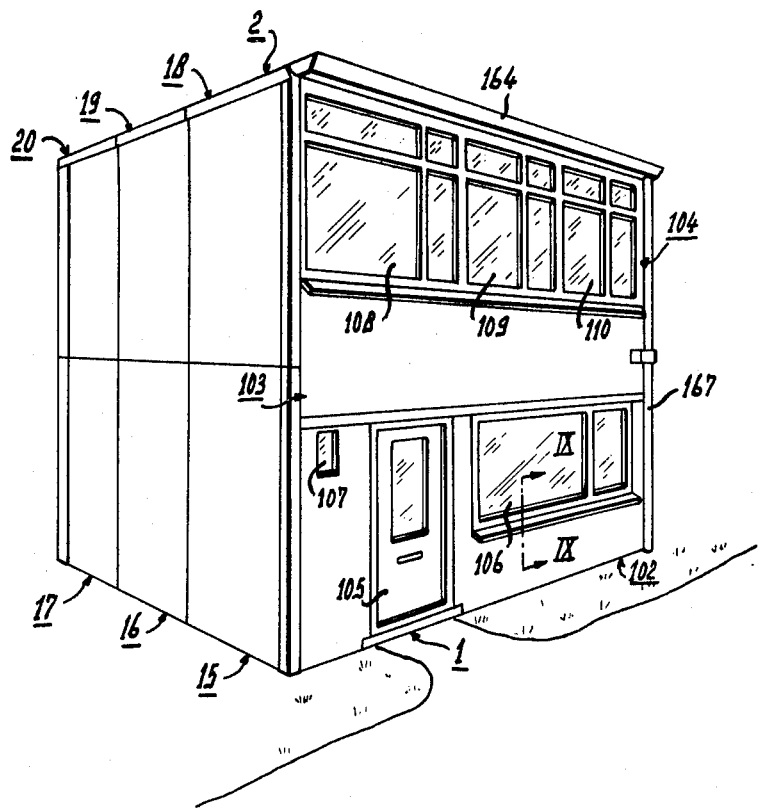
FIGURE 1 is a perspective view of a side facade and a front facade of a building forming a house.

The figures show a building forming a house, which is shown in a perspective view in FIGURE 1. The house comprises two floors 1 and 2, each of which comprises a few rooms or spaces. The floor 1 (FIGURE 2) comprises a living room 3, a kitchen 4, a hall 5, a cupboard 7 and a toilet 8, a staircase 6 communicates with the hall 5 and leads to the floor 2 (see FIGURE 3). The top floor 2 comprises four bedrooms 9, 10, 11 and 12 and a bathroom 13. The top floor has a corridor 14 in the center, which can be attained from the staircase 6 and which leads to the various rooms on this floor 2. The whole house consists of six elements (FIGS. 1 and 4), whereby the ground floor comprises three elements 15, 16 and 17 and the top floor comprises three elements 18, 19 and 20 (see FIGURE 4).

Each of the elements 15 to 20, as is shown in FIGURE 4 for the element 18 comprises a frame of beams, to which the walls for the building are fastened. The element 18 comprises four horizontal beams 21, 22, 23 and 24, extending in the longitudinal direction of the element; the beams 21 and 22 constitute the lowermost longitudinal beams and the beams 23 and 24 constitute the topmost longitudinal beams of the element. The lowermost beams 21 and 22 are connected with each other at their ends by transverse beams 25 and 26 respectively. The beams 23 and 24 are connected with each other at their ends by transverse beams 27 and 28. The lower beam 21 and the top beam 23 are connected with each other by a vertical beam 29 at one end of the element and at the other end by vertical beam 31. In the same manner the horizontal beams 22 to 24 are connected at opposite ends by vertical beams 30 and 32. The beams 21 and 22 are furthermore connected with each other by two intermediate beams 33 and 34, which are horizontal and orthogonal to the beams 21 and 22, respectively, while the beams 23 and 24 are similarly connected with each other by two horizontal intermediate beams 35 and 36. The beams 21 to 32 of the element define a parallelepiped or a box.

The element is reinforced at one end by struts 37 and 38, which extend between the opposite corners of the rectangle formed by the beams 25, 27, 29 and 30. At the other end the element is reinforced by struts 39 and 40, which extend between the opposite corners of the rectangle formed by the beams 26, 28, 31 and 32. The longitudinal beams 21 and 23, lying one above the other, are furthermore linked to each other by a vertical intermediate beam 21A, while similarly the longitudinal beams 22 and 24, lying one above the other, are furthermore connected with each other by a vertical intermediate beam 22A. The number of vertical intermediate beams between the longitudinal beams of an element and their disposition are preferably such that they may serve for supporting walls in the building to form the separation between rooms and spaces in the building.

Consequently, it will be appreciated, an element may comprise a greater or smaller number of vertical intermediate beams than is shown in the embodiment. Moreover, the number of horizontal intermediate beams for the various elements may be greater or smaller in accordance with the position of the element and the function of the walls associated herewith.

FIGURE 5 shows part of the element 15 on an enlarged scale, in which the longitudinal beams 41 and 42 of the element, like the longitudinal beams 43 and 44 of this element are formed by metal U-shaped beams. Also the horizontal transverse beams between the ends of the longitudinal beams 41 to 44, of which only the transverse beams 45 and 46 are shown, are formed by metal U-shaped beams. The four vertical angular beams of the element, of which only the beams 47 and 48 are shown, are formed by metal beams having an angular profile. The horizontal intermediate beams, for example the intermediate beam 49, are preferably formed by metal I-shaped beams. The vertical intermediate beams, for example the vertical intermediate beams 50 and 51 of FIGURE 5, may be formed, in accordance with the associated walls, by metal angular profiles or metal T-profiles. If these intermediate beams are linked to two aligned walls, these beams preferably have a T-profile (FIGURES 2 and 3). If only one wall or two walls arranged at an angle to each other are associated with such beams, as is the case with the element 15 for the beams 50 and 51, these beams are preferably formed by angular profiles. The struts at the ends of the element, for example the struts 52 and 53 of the element 15, may be made from strip material.

The beams of the element constitute the supporting structure for the element and hence the supporting elements for at least part of the building. These beams are, to this end, shaped in a form such that they are capable of withstanding the forces exerted thereon. The lowermost beams of an element will usually support the vertical sides or walls and the lower side or floor. With the house in the embodiment shown, the floors are formed from adjacent boards, which may be arranged in the elements as is shown in FIG. 5. From this figure it is evident that the part of the floor comprised in FIGURE 5 consists of adjacent boards 54, the ends 55 and 56 of which bear on the beams 41 and 42. The boards 54 are supported between their ends 55 and 56 by girders 57 and 58, extending parallel to the longitudinal beams 41 and 42, the ends of these girders being arranged between the flanges of the beams 45 and 49. The girders 57 and 58 are preferably made of timber, so that the boards 54 can be nailed on said girders.

The topmost longitudinal beams 43 and 44 of the element 15 are not required to support such a heavy weight as the beams 41 and 42, since the longitudinal beams 21 and 22 of the element 18, arranged above the element 15, are capable of supporting the weight of and absorbing forces exerted on the parts lying above the beams 43 and 44. The sectional area of the beams 43 and 44 may therefore be smaller than that of the beams 41 and 42. To the bottom sides of the beams 43 and 44 will be secured only the ceiling, to which end wooden transverse girders 59 are arranged between the beams 43 and 44, the ends 60 and 61 of these girders being arranged between the flanges of the U-shaped beams 43 and 44. The lower sides of the transverse girders 59 are co-planar to the lower sides of the beams 43 and 44.

The topmost longitudinal beams of the element 18, which are required to bear the roof, will preferably have the same sectional area as the lower beams 21 and 22 of the element. The sectional area of the beams 21 and 22 is equal to that of the beams 41 and 42 of the element 15. Between the longitudinal beams 23 and 24 are arranged stronger metal intermediate beams 35 and 36 having an I-profile, in order to support the roof and between these I-shaped beams 35 and 36 and the transverse beams 27 and 28 provision may be made of longitudinal girders, e.g., in the same way as the girders 57 and 58 in the element 15.

The vertical side facades 62 and 63 (FIGURES 2 and 3) of the house are formed by walls arranged in the elements 15 to 20 during the prefabrication process. The side facades 62 and 63 consist each of six vertical side or wall portions.

Each wall portion for the side facade of the house is arranged at the ends of an element between the rectangular frame formed by the beams of the element. As is shown for the wall portions of the elements 15 and 18 (FIGURES 6 and 8), a wall portion consists of a wall 64, which is formed by masonry or concrete. The wall 64 is secured in the element 15 to the vertical angular beams 48 and 47 by means of cramp-irons, welded to the beam 48 and to the limb 65 (FIG. 6) of the beam 47 (not shown), these cramp-irons being at right angles to the limb 65 and extending in the wall 64. The wall 64 is provided on the inner side of an element with a layer 66, which constitutes the inner wall face of a room or a further space of the building. The outer side 67 of the wall 64 is preferably co-planar to the inner side 68 (FIG. 6) of the limb 69 of the beam 48. To the outer side of the limb 69 of the beam 48 and the wall 64 is applied a sheet of insulating material 70, which is supported between the beams of the element from the wall 64. This sheet of insulating material is preferably arranged so that it covers the outer sides of the beams of the element. Particularly, when the beams of the element are made from metal, it is advantageous to cover the beams on the outer side, so that via these beams, which have a good thermal conductivity, no or little heat exchange may take place. The sheets 70 may for example be made from fiber or glass wool. The insulating sheets 70 are covered by covering plates 71, which are waterproof and are preferably made from weather resistant material. The plates 71 may, for example, be made from wood, polyester or plastic material. The plates 71 of this embodiment are corrugated, but they may also be smooth. The ornamental layer 66 may be formed by plaster applied to the wall 64, finished further on the inner side by a layer 72 of wall paper, wall paint or the like, in accordance with the kind of space in which the layer 66 constitutes the boundary surface.

The sheet of insulating material 70 may be secured in different ways to the beams and the wall 64. For example the sheet 70 may be stuck to or screwed to the beams 48 and 47. The covering plate 71 is preferably screwed to the element by means of bolts 73 and 74 (FIGS. 8 and 10). For the connection of the bolts 73 and 74 to the element, as is shown in FIG. 8, wooden beams may be provided on the frame beams of the element. In the lower part of the element 15, for example, the beam 45 is provided with a wooden girder 75, which projects slightly beyond the metal beam 45 and the insulating sheet 70 joins the top side of this beam 75 and is co-planar on the outer side with the outer side of the beam 75. Below the beam 75 provision is made of a strip of insulating material 76, which is applied to the outer side of the beam 45. The plate 71 thus bears on the outer side of the beam 75 and the bolt 73 is screwed into the beam 75.

As an alternative, as is shown for the top side of the plate 71, the plate 71 may be secured to the element by means of a bolt 74, which is secured in the metal beam 46 (FIG. 10).

The fastening of the wooden beam 75 to the beam 45 may be carried out in various ways. The beams 75 may e.g., by readily connected with flanges of the beam 45 by means of bolts. For connecting the wall 64 with the wooden beam 75 the latter are provided with cramp-irons 77 (FIG. 8), which are provided at their free ends with bent-over ends (not shown). The beam 46 (FIGS. 5 and 10) may be provided in the same manner on the bottom side with cramp-irons 78, the free ends of which are bent over.

As a further alternative, a wooden beam may be secured to the top element, to which beam the wall and the outer covering plate are secured. For example, the element 18, as is shown in FIGS. 10 and 12, is provided on the lower half with a wooden beam 79, which is secured to the metal frame beam 25 and on the top side with a wooden beam 80, which is arranged on the bottom side of the metal frame beam 27. The top side of the covering plate 81 of the element is secured to the beam 80 with the aid of a screw bolt 82.

The layers of insulating material of two adjacent elements (FIG. 6) are intimately joined to each other. The covering plate 84 and the covering plate 71 of the two adjacent elements 15 and 16 are also joined to each other (FIG. 6). In order to prevent water from penetrating between the covering plates 71 and 84, it is advantageous, to provide on the joined edges of the plates 71 and 84 a covering strip 85. The joined frame beams 48 and 86 of the elements 15 and 16 are linked to each other by one or more bolts 87, which are accommodated in bolt holes in the flanges of the beams 48 and 86. In order to accommodate the bolts 87, when the elements are fastened to each other, provision is made in the walls 64 and 88 of the elements 15 and 16 of spaces 89 and 90, which can be closed by plates 91 and 92. These plates are finished on the outer side so that they match the layers on the walls 64 and 88.

For obtaining a seal between two covering plates of elements lying one above the other, for example the covering plates 71 and 81 of the elements 15 and 18 (FIGS. 10 and 11), the lower side of the covering plate 81 is provided on the front side with an extension 93, which has approximately half the thickness of the plate 81, whereas the top side of the plate 71 is provided on the rear side with an extension 94, which has half the thickness of the plate 71. The extensions 93 and 94 may then be arranged in the manner illustrated in FIG. 11.

The facade walls 100 and 101 (FIGS. 2 and 3) of the house are formed by facade elements which are prefabricated independently of the elements 15 to 20. These facade elements are secured to the other elements during the assembly of the building at the building site. In this embodiment the front facade 101 is built up from three prefabricated elements 102, 103 and 104 (FIGS. 8, 10 and 12). FIG. 8 shows the lower part of the element 102 and the fastening thereof to the lower side of the element 15, whereas FIG. 10 shows the fastening of the facade element 103 to the top side of the element 15 and FIG. 12 shows the fastening of the facade element 104 to the top side of the element 18.

The facade elements 102 to 104 are arranged one above the other and extend throughout the length of the elements 15 and 18. These facade elements 102, 103 and 104 are preferably made so that doors and windows to be arranged in the facade are incorporated as a whole in the element. In the element 102, for example, the door 105 (FIG. 1), the window 106 and a small window 107 are provided, and the element 104 is provided with the windows 108, 109 and 110 of the top floor.

The facade elements consist mainly of a frame, to which plates are secured at a given distance from each other. The facade element 102 (FIGS. 8 and 10) comprises two plates 111 and 112, which are secured at the lower end to a beam 113 and at the top end to a beam 114. The plate 111, which constitutes the outer side of the front facade, is waterproof and weather-resistant. The inner plate 112 consists preferably of a material which is suitable for an inner wall and does not require further finishing processes. The space between the two plates 111 and 112 may be left open. However, this space may also be filled out wholly or partly (see FIG. 9) with a material 115, which has insulating properties. As an alternative, the plate 112 may be made from insulating material or a plate of insulating material may be applied to the side of the plate 112 facing the plate 111.

The connection of the windows, for example of the window 106 to the plates 111 and 112 of the facade wall may be carried out in different ways. FIG. 9 shows one embodiment of part of the connection of the window 106 with the wall consisting of the plates 111 and 112. The window 106 comprises a wooden window beam 116, in which the plane 117 is arranged. The window beam 116 is linked to a beam 118 of the front facade 102 and between the frame 118 and the window beam 116 provision is made of a drain strip 119. The strip 119 constitutes a water arrester below the window 106.

The topmost beam 114 of the front facade element 102 is provided with a recess 120, in which an extension 121 of the lower beam 122 of the element 103 fits (FIG. 10). The front facade element 103 comprises two plates 123 and 124, which, like the facade element 102, are arranged on a framework of wooden beams. On the top side the facade element 103 is provided with a wooden beam 125 and between the beam 122 and 125 this element is provided with a wooden beam 126, which is located at the same level as the frame beam 43 of the element 15. Between the beams 125 and 126 is arranged a zigzag-shaped framework of bars 127, which constitutes a reinforcement. The zigzag-shaped arrangement of the bars 127 is similar to the zigzag-shaped bars in the inner wall shown in detail in FIG. 14, which will be described more fully hereinafter. The bars 127 are provided with pins 127A (FIG. 10), by means of which the bars are connected with the beams 125 and 126, respectively. The plates 123 and 124 are constructed in the same manner as the plates 111 and 112 of the facade element 102 and between the plates 123 and 124 insulating material may be arranged at will.

In order to prevent water from penetrating between the two facade elements 102 and 103, the lower side of the facade element 103 is provided with a strip 128, which is arranged with its top side 129 on the rear side of the plate 124 in the beam 122 and with its lower side 130 it projects over the outer side of the plate 111.

The topmost facade element 104 comprises also a frame of wooden beams. FIGS. 10 and 12 show the lowermost and the topmost beams 131 and 132, respectively and FIG. 12 shows furthermore a side beam 133. Between these beams 131, 132 and 133 is arranged the pane 134 of the window 108. Similarly the windows 109 and 110 are arranged in the element 104. The windows 108, 109 and 110 may, if desired, be arranged at a given distance from each other, while the facade portions between the windows then consist of two plates arranged at a distance from each other, as is shown for the facade elements 102 and 103. Also between the beams 131 and 125 a strip 137 is arranged in order to prevent water from penetrating between the elements 103 and 104.

The fastening of the facade elements 102, 103 and 104 is carried out with the aid of bolts, which are fastened in the frame beams of the elements 15 and 18. FIG. 8 shows a bolt 138, by means of which the facade element 102 is secured to the lowermost beam 41 of the element 15, while FIG. 10 shows a bolt 139, by means of which the facade element 103 is secured to the topmost beam 43 of the element 15. The facade elements 102, 103 and 104 may be secured by means of similar bolts to the vertical frame beams such as the beams 47 and 50 of the element 15. For this fastening operation recesses are provided in the side facades of the inner walls of the building, for example in the same way as the recesses 89 and 90 shown in FIG. 6. In order to secure the bolts 139 to the beam 43, the top horizontal side or ceiling 140, secured to the lower side of the beams 43 and 46, is provided with a hole 141 so that the nut 142 can be screwed onto the bolt 139. The hole 141 is provided on the top side of the ceiling 140 with a stiffening rim 143, on which is arranged the closing plate 144, which is preferably made of the same material as the ceiling 140, so that the hole 141 is closed after the bolt 139 has been mounted. The ceiling 140 and the closing plate 144 are made from suitable material, for example fiber board and the plates of fiber board are secured to the beams 59. The hole 141 provided in the ceiling 140 may at the same time be used for accommodating the bolts 145, by which the topmost beam of the element 15 and the lowermost beam of the element 18 are secured to each other. For arranging the bolts 145, the floor part 146 of the element 18, consisting of adjacent boards 147 is also provided with a hole 148. The floor 146 around the hole 148 is provided with a stiffening rim 149, on which bears the closing plate 150. In certain cases it is sufficient to provide either the hole 141 in the ceiling 140 or the hole 148 in the floor 146 in which case both the bolt 139 and the bolt 145 can be secured through the same hole.

FIG. 8 shows part of the floor of the ground floor arranged in the element 15. This floor comprises the boards 54, shown in FIG. 5. In order to arrange the bolts 138, the floor part of the element 15 is provided with a hole corresponding with the hole 148. This hole is not shown in FIG. 8 for the sake of clarity. FIG 8 shows how the ends 55 of the boards 54 are secured to the beam 41. To this end the ends of the boards 54 are provided on their bottom side with a clamping beam 151 extending along the beam 41. This clamping beam is provided with a recess 152, in which the flange 153 of the beam 41 is accommodated. The beam 151 is secured to the ends 55 of the boards 54 by means of screws 154 and the flange 153 is located between the ends 55 and the part 155 of the beam 151. Since the floors are provided in the elements during the prefabrication process, the arrangement of the clamping beam 151 and the fastening of the boards to the frame beams of the elements can be readily carried out. Also the ceilings for the various rooms of the building, for example the ceiling part 140 shown in FIG. 10 are arranged in the elements during the prefabrication process.

The roof is arranged on the top sides of the topmost elements 18, 19 and 20 and the topmost longitudinal girders 23, 24 of the element 18 and the corresponding longitudinal girders of the elements 19 and 20 support the roof. The roof, like the floor of a story consists of adjacent boards 156, which extend near the outer edges of the roof up to the outer edges of the topmost beams of the elements, which is illustrated in FIG. 12 with the beams 23 and 27. On the adjacent beams of adjacent elements, for example on the beam 24, the boards 156 do not extend up to the outer edge, so that between the boards 156 and 157 of two adjacent elements an opening 158 is left (FIG. 14).

The roof parts are covered each by a layer 159 of waterproof material, for example, roofing felt. The layer 159 is provided near the edges of the element adjacent a further element with a downwardly bent-over rim 160. Near the side facade of the building the layer 159 extends down to the edge of the roof (see FIG. 12). One of the edges of the side facades the roof is reinforced by an angular strip 161 (FIG. 12), one side of which engages the roof and the other side of which engages the side wall, so that penetration of water between the roof and the side wall is avoided. The seal between the angular reinforcement 161 and the covering material 59 is obtained by means of a strip of waterproof material 162, which engages the edge of the angular reinforcement 161. The angular reinforcement 161 is arranged on the element during the prefabrication process.

Near the front facade the covering layer 159 is provided with a bevelled edge 163 (FIG. 12). Along the front facade is arranged a gutter 164, which is secured with the aid of screws (not shown) to the top beam 132 of the element 104. The seal between the gutter, the front facade element 104 and the roof is obtained by means of a strip 165 of waterproof material arranged on these edges, this strip being provided with a bevelled edge 166 on the roof, which edge engages the bevelled edge 163. By means of adhesive the edges 163 and 166 are stuck to each other. By providing the angular reinforcement 161 along the side facade edges, an elevation is formed on the roof which prevents water from running from the roof along the side facades. The water is thus conveyed from the roof to the gutters 164 and to the sewerage via the pipes 167 (FIG. 1).

For a waterproof seal of the adjacent roof portions of two contacting elements, an adhesive filling material 168 is used (FIG. 14), which is provided in the space 158 between the rims 160 of the layers 159 projecting beyond the edges of the boards 156 and 157. On this filling material is stuck a strip 169 of waterproof material.

For ornamentation and/or sun shading purposes a grating may be provided, as is shown in FIG. 13, on the top side of the building along the front facade. This grating comprises laths 170, secured to the roof and projecting beyond the roof and connected with each other by laths 171 and 172, extending parallel to the facade.

The seal of the roof portions arranged on two adjacent elements may also be obtained as is shown in FIG. 15. The adjacent frame beams 173 and 174 of two adjacent elements are provided with embossed parts 175 and 176, so that between the two adjacent beams 173 and 174 a space 177 is left, in which the downwardly bent-over rims 178 and 179 of the covering layers 180 and 181 on the boards of the roof can be clamped tight. The boards 182 and 183 are provided with bevelled edges near the contacting edges of the elements, so that a V-shaped space 184 is formed, in which filling material 185 is provided in order to obtain a satisfactory seal.

The beam 24 of the element 18 and the beam 186 of the element 19 (FIGS. 14, 16) are connected with each other by bolts 187, to which end bolt holes are provided, for example as the holes 188 and 189 in the beams 173 and 174. In order to permit of arranging these bolts 187 in the beams 24 and 186, the ceiling parts near the holes for the bolts 187 have openings 190 and 190A (see FIG. 14). These openings 190 and 190A are closed by fitting plates. In order to facilitate the arrangement of the bolts 187 in the holes of the beams of the elements, these bolts are provided with tapering ends 191 (FIG. 15). In order to ensure a correct alignment of the holes 188 and 189, auxiliary holes 192 and 193 are provided near the bolt holes for the bolts 187 (FIG. 16), for accommodating tapering pins in order to permit a relative displacement of the engaging beams, so that the bolt holes can be aligned.

During the prefarbication of the elements, the inner walls, which constitute the partitions between the rooms of the building, are provided. FIG. 6 shows part of an inner wall 200, which constitutes the partition between the staircase 6 and the cupboard 7. This partition 200 is provided on either side with a layer 201 and 202, respectively, so that after the assembly of the elements the inner walls need no longer be finished further.

FIG. 14 shows part of an inner wall 203, which constitutes the partition between the bathroom 13 and the bedroom 9. This partition 203 is arranged in the element 19 during the prefabrication process and consists of an internal core of light masonry or light cast material 204. The core 204 is provided on either side with a layer 205 and a layer 206, respectively. The wall 203 is secured to the lower beam of the element 19 by means of cramp-irons, for example in the same way as the wall 60 is secured to the wooden girder 75 (see FIG. 8). Between the vertical beams of the element 19, at a distance from the topmost beam 186, a smaller beam 207 formed by a metal U-profile is provided, to which beam, extending throughout the length of the element 19, is secured the wall 203. Between the beams 207 and 186 zigzag-arranged bars 208 are provided for reinforcement. The bars 208 are welded to the beams 186 and 207. If the zigzag-arrangement of bars are secured to the wooden beams, for example the bars 127 (FIG. 10), the bars may be welded to each other, and at the point formed by two welded bars a pin 127A is welded. Between the beams 186 and 207 the inner wall 203 is formed by two plates 209 and 210, arranged at a distance from each other. The outer faces of these plates are co-planar to the outer sides of the beam 207. For fastening the plates 209 and 210 to the beam 207 and the beam 186, these beams are provided with wooden blocks 211, of which only one is shown. Thus a light structure of the inner wall is obtained, which may, in certain cases, even be cheaper than the structure of an inner wall of an internal core 204 with layers 205 and 206. The plates 209 and 210 are provided on the outer side with the desired ornamental layer, as well as the wall 203, for example wallpaper or wall paint.

Owing to the construction of the elements by means of frame beams, very rigid elements are obtained, whereas the walls and the facades of the building may be made from light materials, since these materials need withstand no or only a little amount of forces. The supporting structure of the building is formed by the frame beams of the elements. The corners between the side facades and the front facade may be further reinforced, subsequent to the assembly of the elements, by means of angular reinforcements 212, as is shown in FIG. 12.

Owing to the construction of the elements from metal, highly resistant beams and to provision of light walls on them, the weight of the element as a whole and hence also that of the whole building will be light. A building of the kind shown in this embodiment, and comprising one or more elements, will, as a rule, not require a strong foundation. In many cases it will be possible to dispose the interconnected elements on the levelled ground without the need for further means or, if desired on a floor of, for example, tiles 213, which may have an elevated central portion (FIG. 8). Such a construction of a building has furthermore the advantage that, in the case of a partial sagging, the tear resistance of the building is very great.

The height of the elements may be adapted to the purpose of the building. The elements 15, 16 and 17 of the ground floor have a height 213A and the elements 18, 19 and 20 of the top floor have a height 214 (FIG. 4). The heights 213A and 214 of the elements are preferably greater than 200 cms. and smaller than 350 cms. Although in this embodiment the elements arranged one above the other have the same height, the topmost elements 18 to 20 may have a smaller height than the elements 15 to 17, or conversely. If the elements are used for the erection of a dwelling, as is the case in the embodiment described above, the height of an element will preferably be about 250 cms. The elements for the ground floor, which serves as the dwelling space of the house, may, if desired, have a greater height than the elements of the top floor, in which the bedrooms are arranged. The elements 15 to 20 have a width 215, which is the same for all elements. However, the elements may have different widths. The widths of the elements may differ in accordance with the size of the building, but they will generally be greater than 100 cms. and smaller than 300 cms. The elements will preferably have a width of 250 cms. The length 216 of the elements, like the other dimensions of the elements, may vary with the purpose of the building. If the elements are used for a dwelling, the length 216 will preferably be greater than 300 cms. and smaller than 1,000 cms. For dwellings and smaller offices and the like, the length of an element will generally be about 650 cms.

Since the elements are to be transported from the factory works to the building site, the dimensions of the elements are such that transport can be readily carried out. The dimensions of the elements preferably come up to the legal prescriptions for road transport with respect to width, length and height of work pieces.

For the electric and sanitary outfit of the house the required ducts can be arranged in the elements during the prefabrication process, so that during the assembly of the elements water, gas and light will be soon available. Since the elements are completely finished during the prefabrication process, with even doors and windows are provided in the facades and inner walls and all layers are applied to the walls during the prefabrication, the assembly can be carried out very rapidly.

The mounting of doors in the building between two adjacent rooms or the mounting of the outer doors can be carried out by fastening them to the metal beams. The beams 207 (FIG. 14), which is located at a given distance from the beam 186 may be arranged so that it coincides with the top side of a door frame, so that the door frame can be secured to such a beam. The lower side of the door frame can be secured to the lowermost beam of the element.

Although in this embodiment an element formed in the shape of a parallelepiped is provided during the prefabrication process with the side facades of the house, the floor, the roof, the ceiling and the inner walls, one or more of these walls, which constitute boundary surfaces of the rooms, may be constructed like the front facade consisting of the parts 102, 103 and 104. However, as a further alternative, all wall parts, consequently also the front facade and the rear facade may be secured to the element during the prefabrication process. By arranging the walls as far as possible on the frame beams of the elements during the prefabrication process, the elements can be assembled at the building site within a minimum space of time. The elements are not oversensitive to shocks and bumps during transport owing to their rigid frames.

Although in this embodiment each element consisting of metal frame beams with intermediate walls is shaped in the form of a parallelepiped, flat elements may be used, which comprise a frame of beams to which the walls are wholly or partly secured during the prefabrication process.

It will be obvious that the inner walls and the outer walls, as well as the ceiling, the floor and the roof may be constructed in a manner differing from that of the embodiment shown. These walls are, however, preferably of a light weight in order to reduce the weight of the elements. This is advantageous, inter alia, for transport purposes. The frame beams of the elements may be made from other material than metal. The frame beams of an element may even be made from different materials. The frame beams of an element, which are welded to each other in this embodiment, may be secured to each other wholly or partly by means of bolts. The angular reinforcements at the edge of the roof and the side facades are adapted to avoid damage of the elements during transport. Such stiffening edges may furthermore be provided on further walls of the element in order to avoid damage. These angular reinforcements may, if desired, be removed at the place of destination.

What I claim is:

1. A building having at least one story and comprising a plurality of prefabricated box-shaped elements, each of said elements contributing to the commutual space of the building, each of said elements being provided with vertical and horizontal sides and a framework of vertical and horizontal metal beams in the form of a parallelepiped, a wall of concrete secured to said vertical beams of said framework, a floor connected to the lower of said horizontal beams of said framework, the topmost elements of the building each having at least part of a roof, a ceiling secured to the higher of said horizontal beams of said framework beneath said roof, said higher beams being channel beams with the beams of adjacent elements being disposed in a back-to-back relationship, fastening means through said channel beams connecting the frameworks of adjacent elements to one another, said roof including board means supported by said channel beams, waterproof material disposed over said board means, a channel formed between said board means of adjacent elements, said waterproof material bent over the edges of said board means adjacent the place said channel beams are connected, said channel filled with adhesive filling material, and a waterproofing sheet of material secured across said filling material to said first-mentioned waterproof material.

2. A building as claimed in claim 1, wherein said roof includes eaves which are provided with a stiffening protective rim.

References Cited by the Examiner

UNITED STATES PATENTS

| | | | |
|---|---|---|---|
| 1,258,914 | 3/1918 | Kramer | 52—11 |
| 1,362,069 | 12/1920 | Witzel | 52—745 |
| 2,037,895 | 4/1936 | Gugler | 52—173 |
| 2,154,142 | 4/1939 | Whelan | 52—79 |
| 2,263,214 | 11/1941 | Larkin et al. | 52—90 |
| 2,427,937 | 9/1947 | Willson | 52—198 |
| 2,486,723 | 11/1949 | Thompson | 20—92 |
| 2,499,498 | 3/1950 | Hammond | 52—67 |
| 2,611,422 | 9/1952 | Roney | 20—92 |
| 3,019,861 | 2/1962 | Rasch et al. | 52—639 |

FOREIGN PATENTS

| | | |
|---|---|---|
| 1,125,442 | 7/1956 | France. |
| 1,244,983 | 9/1960 | France. |
| 572,894 | 2/1958 | Italy. |

FRANK L. ABBOTT, *Primary Examiner.*

WILLIAM I. MUSHAKE, JACOB L. NACKENOFF, *Examiners.*

C. G. McBRIDE, K. E. PAYNE, *Assistant Examiners.*